D. VON NAGY.
DEPRESSION RANGE FINDER.
APPLICATION FILED DEC. 9, 1907.
918,191.
Patented Apr. 13, 1909.
2 SHEETS—SHEET 2.
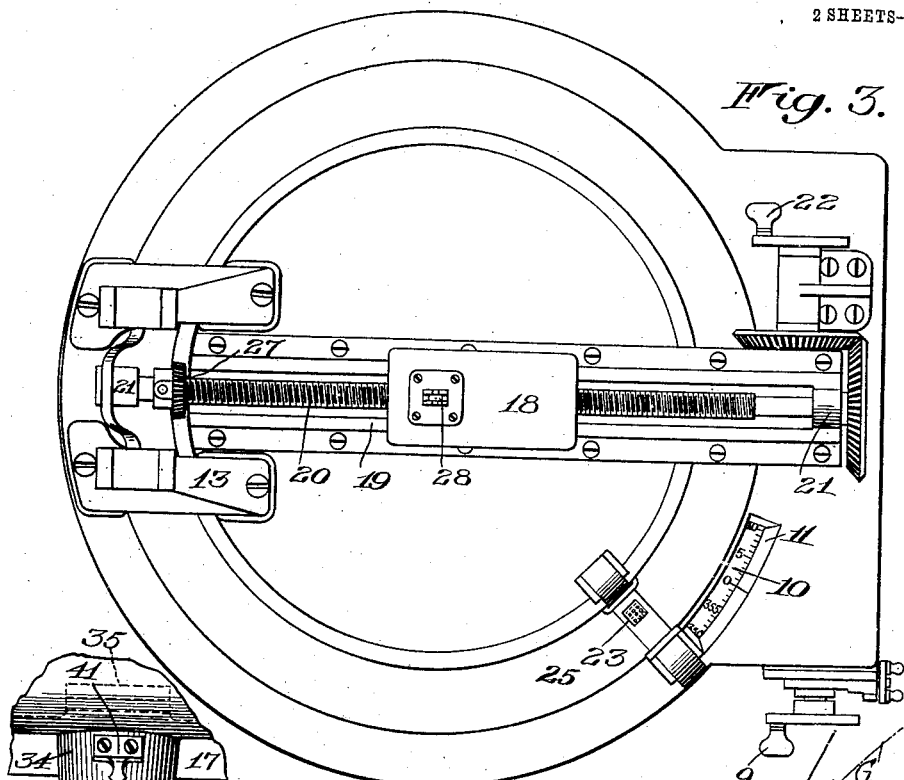
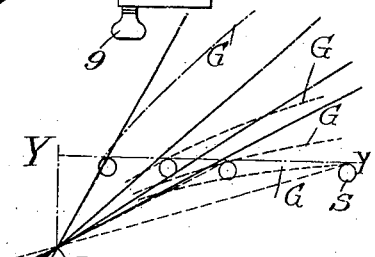
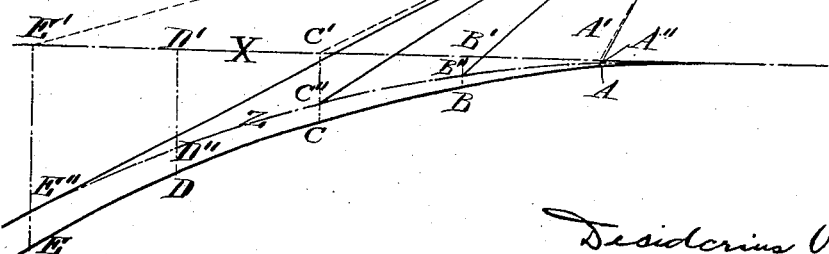
Witnesses
Inventor
Desiderius Von Nagy
By Church & Rich
his Attorneys

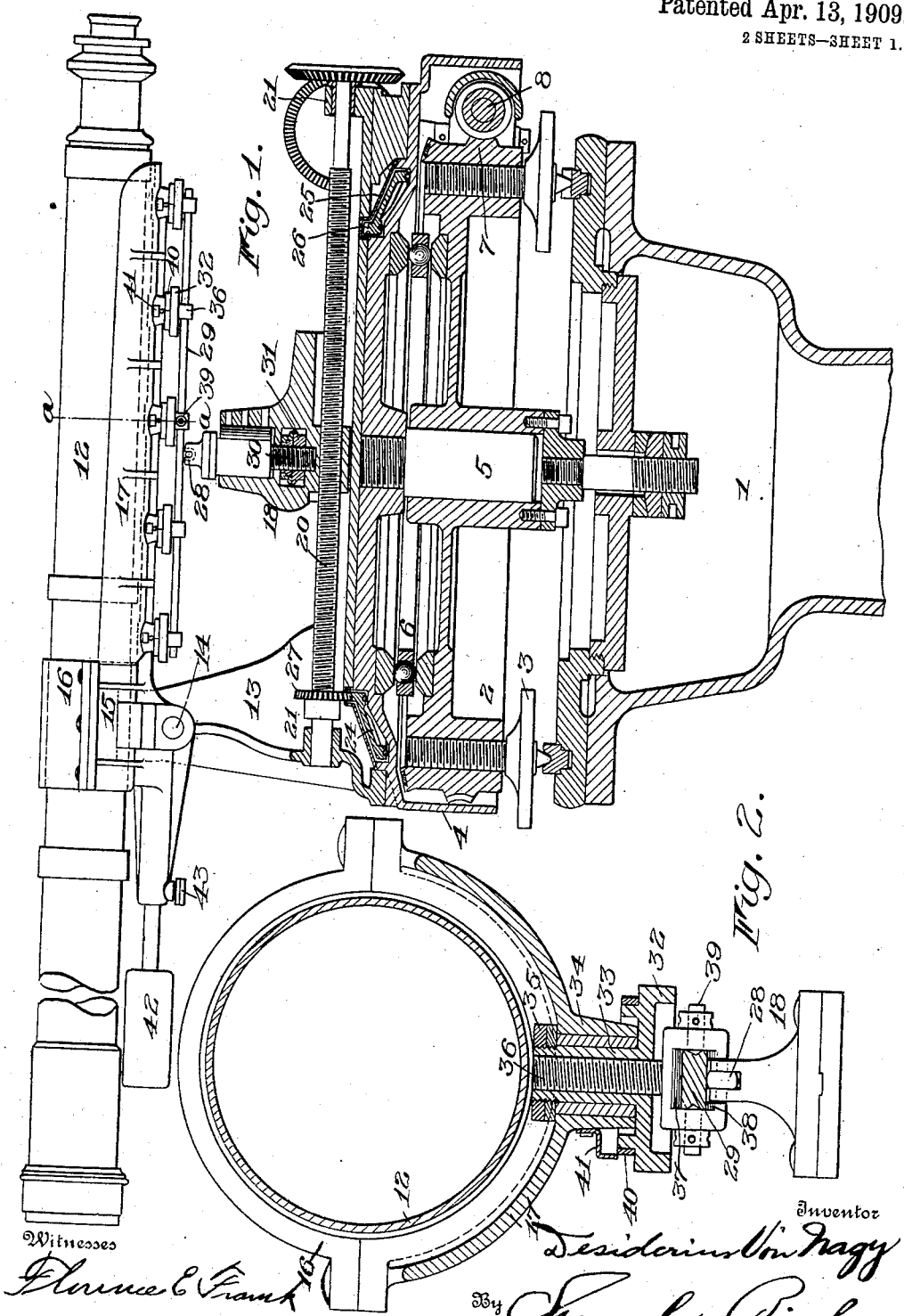

UNITED STATES PATENT OFFICE.

DESIDERIUS VON NAGY, OF ROCHESTER, NEW YORK, ASSIGNOR, BY MESNE ASSIGNMENTS, TO BAUSCH & LOMB OPTICAL COMPANY, OF ROCHESTER, NEW YORK, A CORPORATION OF NEW YORK.

DEPRESSION RANGE-FINDER.

No. 918,191.     Specification of Letters Patent.     Patented April 13, 1909.

Application filed December 9, 1907. Serial No. 405,696.

*To all whom it may concern:*

Be it known that I, DESIDERIUS VON NAGY, of Rochester, in the county of Monroe and State of New York, have invented certain new and useful Improvements in Depression Range-Finders; and I do hereby declare the following to be a full, clear, and exact description of the same, reference being had to the accompanying drawings, forming a part of the specification, and to the reference characters marked thereon.

The present invention, which relates to depression range finders of the type disclosed in my application, Serial No. 403,487, filed November 23, 1907, wherein is disclosed a construction having provision for correcting the instrument from a plurality of known points for the curvature of the earth and the refraction of the atmosphere, has for an object to provide a construction having provision for making corrections from known points intermediate the limits of the range of the instrument.

To these and other ends the instrument consists in certain improvements and combinations of parts all as will be hereinafter more fully described, the novel features being pointed out in the claims at the end of the specification.

In the drawings: Figure 1 represents a view partly in section and partly in elevation showing a range finder constructed in accordance with this invention; Fig. 2 represents a section on the line $a$—$a$ of Fig. 1; Fig. 3 represents a plan view of the construction shown in Fig. 1 with the telescope and its cradle removed; Fig. 4 represents a detail view partly in section showing one of the adjusting devices for the guides; and Fig. 5 is a diagram to illustrate the theory of the invention, the lines representing the depression of the telescope being shown at exaggerated angles to the base or sea level.

While as stated in my application above mentioned correction from two known points for the curvature of the earth and the refraction of the atmosphere will render the instrument substantially correct for intermediate points, nevertheless when these two points are located at a very great distance from each other the readings have not sufficient accuracy.

With this invention when the limits of the range of the instrument are at such a distance that the readings for intermediate positions are not accurate, the instrument may be corrected for one or more intermediate positions.

As in my previously mentioned application the telescope is mounted to turn about a horizontal axis and has a support S for turning it about its axis V, movable horizontally a distance proportional to the range of the instrument, and having a height proportional to the height of axis of the telescope above sea level. The telescope is adjusted until the indicating means registers the distance of a known object A, when the optical axis of the telescope will be directed at a point A' on the dot and dash line X representing sea level (neglecting the effect of the curvature of the earth) which is parallel to the dot and dash line Y representing the line on which the horizontal support moves. The object A, however, owing to the refraction of the atmosphere will appear to be located at a point A'' and, therefore, the telescope is adjusted independently of the indicator in order that the object will be properly imaged on the cross hairs and the instrument corrected for the curvature of the earth and refraction of the atmosphere at this point. The instrument is now corrected from known points B, C, D and E, in the same manner as from the point A, the telescope by its first adjustments being directed at points B', C', D' and E' respectively, and then at the refracted images B'', C'', D'' and E'', the curve of the refraction being indicated by line Z, and the curve of the guide on the telescope for the horizontally movable support being indicated by lines G.

As a preferred manner of constructing this invention, there is employed a base or pedestal 1 on which a suitable azimuth table 2 is supported by leveling devices 3, so that the rotary support 4 may turn about a true vertical axis 5 in order that the finder may be pointed in any direction, a ball bearing ring 6 being interposed between the azimuth table and the rotary support to permit the latter to turn freely. The mechanism for moving the support preferably comprises a worm wheel 7 integral with the table and engaged by a worm 8 which is mounted on the rotary support 4 and operated by a crank arm 9 at one end thereof, a scale 10 on the table being visible through a window 11 in the support 4 and indicating the position of the latter.

The telescope 12 is carried by the rotary support which for this purpose is provided with a pair of uprights 13 having bearings at their upper ends to receive trunnions 14 on a cradle 15 the telescope being clamped to the cradle by a clamping plate 16, and the cradle having a rear extension 17 for carrying the guide (to be described) for the horizontally movable support 18 which is also mounted on the rotary support and forms part of the mechanism for turning the telescope about its horizontal axis 14 being guided on the rotary support 4 on a track 19 so that it can move in the direction of the axis of the telescope, its movement being preferably effected by a screw 20 extending longitudinally of the track and journaled in bearings 21, the screw being manually operable by means of a crank handle 22.

The position of the horizontally movable support 18 relatively to the horizontal axis 14 of the telescope is determined by a suitable indicating means which moves in concordance with the telescope to determine the range or distance of the object. This mechanism in the present instance is the same as that described in my application before mentioned and comprises an annulus 24 mounted on ball bearings to turn on the rotary support about an axis coincident with the turning axis 5 of the latter, the annulus being inclosed by a housing 25 and carrying a crown gear 26 exposed at one point in order that a pinion 27 on the screw shaft 20 may mesh therewith. On the upper face of the annulus is formed a spiral series of numbers ranging in the present instance from 2,000 to 12,000 and indicating in yards the distance of the object, the numbers being visible through a window 23 movable transversely of the scale in the manner described in my application, before mentioned.

The upper end of the horizontally movable support 18 carries a roller 28 which moves on a track or guide 29 carried by the telescope, and to be hereinafter described; and in order to adapt the range finder to different heights above sea level I construct the movable support so that it is extensible in order that its height may be proportional to the position of the instrument above sea level. In the present instance the support is composed of two members, an upper roller carrying member having a depending screw rod 30, and a lower member in the form of a hollow post receiving the upper portion and carrying the thumb nut 31 by which relative movement of the members is secured, suitable scales such as described in my application before mentioned being employed for determining the proper height of the support.

If the track or guide 29 carried by the telescope be parallel to the optical axis of the telescope, and the telescope be adjusted so that the indicator reads 2000 then the telescope will be directed at the point A', and the object at this point A will be incorrectly positioned relatively to the cross hairs owing to the refraction of the atmosphere and the curvature of the earth. So in order to correct the indicating means for these errors the guide or track 29 is preferably made flexible and in the form of a steel bar, and is adjusted by a plurality of devices, two for the limits of the range of the instrument and one or more, in this instance three, for positions intermediate the limits of the range.

All of the adjusting devices may be of like construction and each comprises in this instance a rotary thumb nut 32 having an upward extension 33 journaled in depending boss 34 on the cradle and held therein by nuts 35. This thumb nut turns on a screw 36 which has a bifurcated member at its lower end, the flexible bar being arranged between the arms of the bifurcated member and between upper and lower fulcrums 37 and 38 thereon, the lower fulcrum being divided and having its two portions extending inwardly from the proximate faces of the arms of the bifurcated member, thus permitting the roller on the support to travel on the under face of the flexible bar. The bar slides on the fulcrums due to the bending or flexing thereof by the adjusting devices, but to retain it in position, one of the adjusting devices, preferably the middle one, has two pivot screws 39 which enter notches in the side of the bar.

In order that the finder may be used at night or when the known points have been destroyed by an enemy, the adjusting devices are provided with indicating means and in this way may be set to suit normal conditions at the known points. The indicating means comprises a scale having 100 divisions and arranged on an upwardly projecting annular flange 40 on the thumb nut 32, an index 41 being carried by the cradle and coöperating with the scale. Extending forwardly from the cradle is an adjustable counterweight 42 held by a set screw 43 and serving to prevent undue friction between the guide 29 and the horizontally movable support, thereby making the instrument quickly responsive to the operator.

In operation the horizontally movable support 18 is adjusted to positions on the guide 29 corresponding to the positions of the known points and at each adjustment the corresponding guide adjusting device is manipulated to correct for the curvature and the refraction at this point. After the correction for all the known points the finder will be substantially correct for unknown intermediate points.

A finder constructed in accordance with this invention is simple to operate and inexpensive to manufacture, and permits correction of the indicating means for refraction whether the line of the latter be irregular or curved.

I claim as my invention.

1. In a range finder, the combination with a telescope mounted to turn about a horizontal axis, of indicating means for determining the distance of an object, devices for correcting the instrument for the curvature of the earth and the refraction of the atmosphere from two known points serving as the limits of the range of the instrument, and a device for correcting the instrument for curvature of the earth and refraction of the atmosphere from a point intermediate said limits.

2. In a range finder, the combination with a telescope mounted to turn about a horizontal axis, of indicating means for determining the distance of an object, a horizontally movable support connected to the indicating means and turning the telescope about its axis, a guide upon which the support travels to determine the depression of the telescope, devices for adjusting the guide to correcting the instrument for the curvature of the earth and refraction of the atmosphere from two known points, serving as the limits of the range of the instrument, and a device for adjusting the guide to correct the instrument for the curvature of the earth and the refraction of the atmosphere from a known point intermediate the said limits.

3. In a range finder, the combination with a telescope mounted to turn about a horizontal axis, of a support having a horizontal movement proportional to the range, an indicating means operating on the movement of the support, a guide carried by the telescope, on which the support travels, devices for adjusting the guide to correct the instrument for the curvature of the earth and the refraction of the atmosphere from two known points serving as limits of the range of the instrument, and a device for adjusting the guide from an intermediate known point to correct for the curvature and the refraction.

4. In a range finder, the combination with a telescope mounted to turn about a horizontal axis, of indicating means for determining the distance of an object, a horizontally movable support connected to the indicating means and turning the telescope about its axis, a flexible guide upon which the support travels to determine the depression of the telescope, and devices for adjusting said guide to correct for curvature of the earth and the refraction of the atmosphere from a plurality of known points.

5. In a range finder, the combination with a telescope mounted to turn about a horizontal axis, of a support having a horizontal movement proportional to the range, an indicating means operating on the movement of the support, a flexible guide carried by the telescope and devices for adjusting the guide to correct for the curvature of the earth and the refraction of the atmosphere from a plurality of known points.

6. In a range finder, the combination with a telescope mounted to turn about a horizontal axis, of indicating means for determining the distance of an object, a horizontally movable support connected to the indicating means, a bar adjustably supported by the telescope and having the horizontally movable support movable thereon.

7. In a range finder, the combination with a telescope mounted to turn about a horizontal axis, of indicating means for determining the distance of an object, a horizontally movable support connected to the indicating means, a guide bar on which the support travels, and bifurcated members adjustably secured to the telescope and having upper and lower fulcrums between which the bar is arranged.

8. In a range finder, the combination with a telescope mounted to turn about a horizontal axis, of indicating means for determining the distance of an object, a horizontally movable support connected to the indicating means, a guide bar on which the support travels, screws having the guide bar secured to their lower ends, and thumb nuts connected to the screws for moving them.

9. In a range finder, the combination with a telescope mounted to turn about a horizontal axis, of indicating means for determining the distance of an object, a horizontally movable support connected to the indicating means, a guide bar on which the support travels, thumb nuts secured to the telescope, screws operated by the thumb nuts, and bifurcated members carried by the screws and having upper and lower fulcrums between which the guide bar is arranged.

10. In a range finder, the combination with a telescope mounted to turn about a horizontal axis, of indicating means for determining the distance of an object, a horizontally movable support connected to the indicating means, an adjustable guide on said telescope, and a counterweight acting on the telescope to prevent undue friction between the guide and the horizontally movable support.

11. In a range finder, the combination with a rotary support, of a cradle pivoted on the rotary support to turn about a horizontal axis, and having a rearward extension, a telescope secured to the cradle, an adjustable guide carried by the rearward extension of the cradle, a horizontally movable support movable on the guide and the rotary support, and indicating means connected to the horizontally movable support.

DESIDERIUS VON NAGY.

Witnesses:
HENRY C. THON,
D. M. SMITH.